US010110921B2

(12) United States Patent
Olivier et al.

(10) Patent No.: US 10,110,921 B2
(45) Date of Patent: Oct. 23, 2018

(54) METHOD OF AND DEVICE FOR ENCODING AN HDR VIDEO TOGETHER WITH AN LDR VIDEO, METHOD OF AND DEVICE FOR RECONSTRUCTING ONE OF AN HDR VIDEO AND AN LDR VIDEO CODED TOGETHER AND PF STORAGE MEDIUM

(71) Applicant: THOMSON LICENSING, Issy de Moulineaux (FR)

(72) Inventors: Yannick Olivier, Thorigne Fouillard (FR); David Touze, Rennes (FR); Philippe Bordes, Laille (FR); Franck Hiron, Chateaubourg (FR)

(73) Assignee: Thomson Licensing, Issy-les-Moulineaux (FR)

( * ) Notice: Subject to any disclaimer, the term of this patent is extended or adjusted under 35 U.S.C. 154(b) by 324 days.

(21) Appl. No.: 14/370,773

(22) PCT Filed: Dec. 18, 2012

(86) PCT No.: PCT/EP2012/076010
§ 371 (c)(1),
(2) Date: Jul. 5, 2014

(87) PCT Pub. No.: WO2013/102560
PCT Pub. Date: Jul. 11, 2013

(65) Prior Publication Data
US 2014/0369410 A1    Dec. 18, 2014

(30) Foreign Application Priority Data

Jan. 6, 2012 (EP) ..................................... 12305020

(51) Int. Cl.
*H04N 19/36* (2014.01)
*H04N 19/597* (2014.01)
(Continued)

(52) U.S. Cl.
CPC ........... *H04N 19/597* (2014.11); *H04N 19/30* (2014.11); *H04N 19/36* (2014.11); *H04N 19/59* (2014.11); *H04N 19/61* (2014.11); *H04N 19/50* (2014.11)

(58) Field of Classification Search
CPC ...... H04N 19/597; H04N 19/50; H04N 19/30; H04N 19/61
(Continued)

(56) References Cited

U.S. PATENT DOCUMENTS

2008/0175494 A1    7/2008   Segall
2009/0041376 A1    2/2009   Carletta et al.
(Continued)

FOREIGN PATENT DOCUMENTS

CN       102282838       12/2011
JP       2009207114       9/2009
(Continued)

OTHER PUBLICATIONS

Manituk etal: Backward compatible high dynamic range MPEG video compression; ACM, 2006, pp. 713 to 723.
(Continued)

*Primary Examiner* — Nguyen Truong
(74) *Attorney, Agent, or Firm* — Brian J. Dorini; Ronald J. Kolczynski

(57) ABSTRACT

The inventors realized that representing HDR content using LDR content and HDR residual is not unproblematic. The invention therefore proposes representing HDR content using LDR content, LDR residual and global illumination data, instead. That is, it is proposed a method of encoding an HDR video of high dynamic range together with an LDR video, the LDR video providing a lower dynamic range depiction of the HDR video content, the method comprising using processing means for encoding one video of the LDR
(Continued)

video and a further LDR video extracted from the HDR video independent from the other video of the LDR video and the HDR video and predictive encoding the other video using the one video as reference, and lossless encoding global illumination data further extracted from the HDR video. This has the advantage that prediction is more stable and globally optimal predictors are more easily found.

24 Claims, 8 Drawing Sheets

(51) Int. Cl.
    *H04N 19/30*    (2014.01)
    *H04N 19/61*    (2014.01)
    *H04N 19/59*    (2014.01)
    *H04N 19/50*    (2014.01)

(58) Field of Classification Search
    USPC .................................................. 375/240.12
    See application file for complete search history.

(56) References Cited

U.S. PATENT DOCUMENTS

| | | |
|---|---|---|
| 2009/0046207 A1 | 2/2009 | Salvucci |
| 2009/0317017 A1 | 12/2009 | Au et al. |
| 2010/0172411 A1 | 7/2010 | Efremov et al. |

FOREIGN PATENT DOCUMENTS

| | | |
|---|---|---|
| JP | 2010541383 | 12/2010 |
| JP | 2011509536 | 3/2011 |
| KR | 2011064631 | 6/2011 |
| WO | WO2009045636 | 4/2009 |
| WO | WO2009087952 | 7/2009 |
| WO | 2010082692 A1 | 7/2010 |
| WO | WO2010105036 | 9/2010 |
| WO | WO2010132237 | 11/2010 |
| WO | WO2012004741 | 1/2012 |
| WO | WO2012147010 | 11/2012 |

OTHER PUBLICATIONS

Theobalt etal: "High-Quality Reconstruction from Multiview Video Streams", IEEE Signal Processing Magazine, vol. 24, No. i3, Nov. 1, 2007, pp. 45-57.
Search Report dated Feb. 12, 2013.
Coria et al: "Using temporal correlation for fast and highdetailed video tone mapping" Imaging Systems and Techniques (IST), 2010 IEEE International Conference on, IEEE, Piscataway, NJ, USA, Jul. 1, 2010 (Jul. 1, 2010), pp. 329-332, XP031732652.
Mantiuk et al: "High Dynamic range image and video compression—Fidelity matching human visual performance" ICIP 2007.
Libert et al: "Linearly Homomorphic Structure-Preserving Signatures and Their Applications", CRYPTO, International Association for Cryptologic Research, Aug. 18, 2013, pp. 289-307.
Stinson et al:, "Provably Secure Distributed Schnorr Signatures And a (t, n) Threshold Scheme for Implicit Certificates", ACISP, LNCS, Springer, DE, Jul. 11, 2001, pp. 417-434.
Motra et al.; "An Adaptive Logluv Transform for High Dynamic Range Video Compression," Image Processing, (ICIP), 2010 17th IEEE Int'l Conference, Sep. 26-29, 2010.

METHOD OF AND DEVICE FOR ENCODING AN HDR VIDEO TOGETHER WITH AN LDR VIDEO, METHOD OF AND DEVICE FOR RECONSTRUCTING ONE OF AN HDR VIDEO AND AN LDR VIDEO CODED TOGETHER AND PF STORAGE MEDIUM

This application claims the benefit, under 35 U.S.C. § 365 of International Application PCT/EP2012/076010, filed Dec. 18, 2012, which was published in accordance with PCT Article 21(2) on Jul. 11, 2013 in English and which claims the benefit of European patent application No. 12305020.5, filed Jan. 6, 2012.

FIELD OF THE INVENTION

The invention is made in the field of coding of videos of high dynamic range. In particular, the invention is made in the field of coding of videos of high dynamic range together with an low dynamic range video depicting same content as the video of high dynamic range.

BACKGROUND OF THE INVENTION

Videos are generally represented on a limited number of bits (for instance 8, 10, 12 or more bits), corresponding to a limited range of values to represent the luminance signal. Videos represented in such way are called videos of low dynamic range or, shortly, LDR videos. However the human visual system is able to perceive a wider range of luminance. The limited representation most often does not allow for reconstructing correctly small signal variations, in particular in extremely dark or bright video image areas i.e. areas of high or low luminance. The HDR (High Dynamic Range) format consists in significantly extending bit-depth of signal representation to integer representation with more bits e.g. 20 to 64 bits, or even to floating representation, in order to keep a high accuracy of the signal on its entire luminance range.

HDR images or videos can be captured in various ways. For instance, Digital Single Lens Reflex cameras can use bracketing technique to capture successive images of the same scene with different exposures wherein exposure is the total density of light allowed to fall on the imaging medium (photographic film or image sensor) during the process of taking an image. Those images of different exposures are represented as LDR images. Under-exposed images capture details in the bright areas whereas over-exposed images capture details in the dark areas, as exemplarily depicted in FIG. 1 for different exposure values EV.

By fusion of these differently exposed LDR images an HDR image/video can be produced with a floating point representation, the produced HDR image/video containing all details those in dark areas as well as those in bright areas.

An HDR image/video cannot be used in its source format with devices designated for use with LDR images, e.g. set-top-boxes, PVR, and legacy displays. Anyway, a process called Tone Mapping, allows representing the image while ensuring a good restitution of the different signal intensity segments, in particular, in high and low intensity ranges. Tone Mapping creates, from an HDR image, a LDR image where all the elements are correctly exposed. The LDR image is much more detailed both in dark areas and in white areas. This is exemplarily depicted in FIG. 2.

HDR is used, in particular, in post-production. Most if not all special effects tools are dealing with HDR images with a floating point representation. The mixing being natural scene and special effects is also realized in HDR representation. At the end of the post-production process Tone Mapping is commonly applied to create a standard, e.g. 8/10/12-bit, master under the control of the Director of Photography.

The Tone Mapping applied in post processing is commonly an unknown one.

In United States Patent Application 2008/0175494 it is described a method for predicting a high dynamic range image element, said method comprising: receiving low dynamic range image data; receiving high dynamic range image data comprising prediction data and an HDR residual image element; extracting an LDR image value from said LDR image data; modifying said LDR image value based on said prediction data; and combining said modified LDR image value with said HDR residual image element to form an HDR image element.

SUMMARY OF THE INVENTION

The inventors realized that representing HDR content using LDR content and HDR residual is not unproblematic. The invention therefore proposes representing HDR content using LDR content, LDR residual and global illumination data, instead.

That is, it is proposed a method according to claim 1 and a device according to claim 2 for encoding an HDR video of high dynamic range together with an LDR video, the LDR video providing a lower dynamic range depiction of the HDR video content. The proposed method comprises using processing means for encoding one video of the LDR video and a further LDR video extracted from the HDR video independent from the other video of the LDR video and the HDR video and predictive encoding the other video using the one video as reference, and lossless encoding global illumination data further extracted from the HDR video. The encoding device comprises said processing means.

This has a variety of advantages. For instance, due to the same bit depth of reference and predicted content, prediction is more stable and globally optimal predictors are more easily found. Additionally, this approach allows to subsample this HDR content without introducing artifacts like halos on the high gradients, for instance. Moreover, this approach is adopted to exploit efficiency of a classical 8 bits encoding scheme like AVC for instance.

The features of further advantageous embodiments of the encoding method and of the encoding device are specified in the dependent claims.

It is further proposed a method according to claim 10 and a device according to claim 11 for reconstructing an HDR video of high dynamic range. Said reconstruction method comprises using processing means for decoding an LDR video, the LDR video providing a lower dynamic range depiction of the HDR video content, using the LDR video and a residual for decoding a further LDR video, the further LDR video providing a further lower dynamic range depiction of the HDR video content, decoding global illumination data and using the global illumination data and one of the LDR video and the further LDR video for reconstructing the HDR video. The reconstruction device comprises said processing means.

The features of further advantageous embodiments of the reconstruction method and of the reconstruction device are specified in the dependent claims.

The invention also proposes a data stream and/or a non-transitory storage medium carrying an HDR video encoded together with an LDR video, the LDR video providing a lower dynamic range depiction of the HDR video content, the HDR video being encoded together with the LDR video according to the proposed encoding method or an embodiment thereof.

BRIEF DESCRIPTION OF THE DRAWINGS

Exemplary embodiments of the invention are illustrated in the drawings and are explained in more detail in the following description. The exemplary embodiments are explained only for elucidating the invention, but not for limiting the invention's disclosure or scope defined in the claims.

In the figures.

EXEMPLARY EMBODIMENTS OF THE INVENTION

The invention may be realized on any electronic device comprising a processing device correspondingly adapted. For instance, the invention may be realized in a television, a video phone, a set top box, a gateway, a personal computer, or a digital video camera.

Some exemplary embodiments of the invention are based on a multi-view (MVC) encoding scheme where a main view is intra-view predictive encoded, e.g. according to H.264/AVC. The main view can be decoded by any AVC decoder independent from whether the decoder can further decode an auxiliary view of the MVC scheme. In these embodiments, an LDR video is encoded in the main view. The auxiliary view contains either global illumination data GID or an LDR video residual. If the global illumination data GID isn't contained in the auxiliary view it is conveyed differently, e.g. as lossless encoded meta data of the MVC code.

In exemplary embodiments where auxiliary view contains global illumination data GID, the LDR video image of the main view can be modified based on said global illumination data GID for forming an HDR video image.

In first exemplary embodiments where auxiliary view contains an LDR video residual, the LDR video image of the main view can be modified based on global illumination data GID for forming an HDR video image. The LDR video image of the main view can further be combined with the LDR residual video image in the auxiliary view for forming another LDR video image.

In second exemplary embodiments where auxiliary view contains an LDR video residual, the LDR video image of the main view can be combined with the LDR residual video image in the auxiliary view for forming a further LDR video image wherein the further LDR video image can be modified based on global illumination data GID for forming an HDR video image.

In said second exemplary embodiments, the LDR video image can be a tone mapped version of the HDR video image wherein the tone mapping UTM used is irrelevant, e.g. unknown. There are plenty of different Tone Mapping techniques that can be used either in post-production or in real-time live products.

Figure 1:
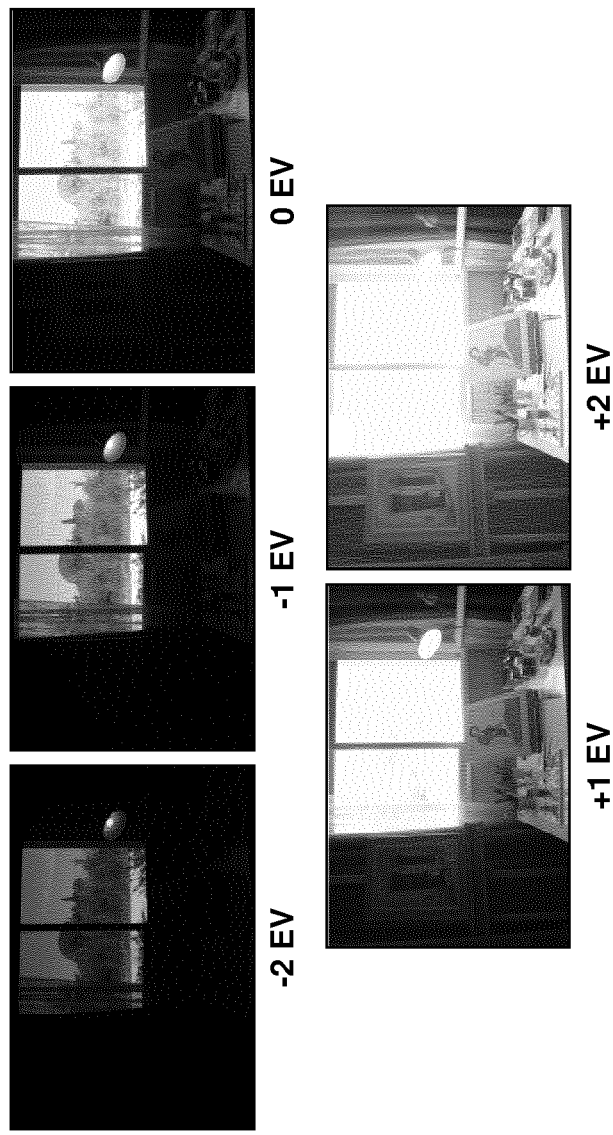
FIG. 1 depicts exemplary images of same content captured with different exposures.
Figure 2:
FIG. 2 depicts, on the left, an exemplary low dynamic range image with over exposed areas and, on the right, another exemplary low dynamic range image resulting from tone mapping of a corresponding high dynamic range image will all areas being well-exposed.
Figure 2:
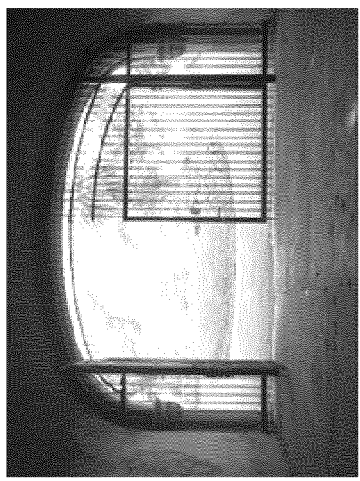
Figure 3:
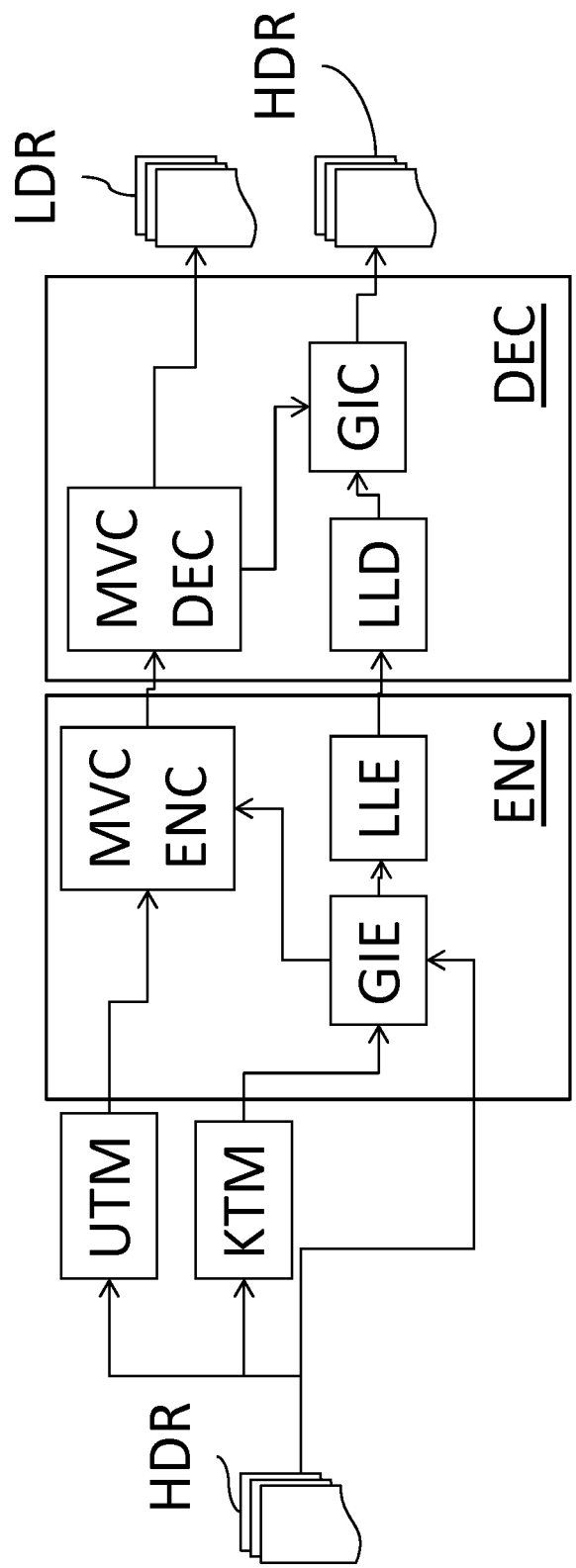
FIG. 3 depicts a first exemplary framework of the invention.

Then, at the encoder side ENC, as exemplarily depicted in FIG. 3, a further Tone Map KTM can be applied to the HDR video using an appropriate Tone Mapping technique to create the further LDR video which then is a second LDR Tone Mapped version of the HDR video. Preferably but not necessarily the second LDR Tone Mapped version of the HDR video is close to the original Tone Mapped version in order to minimize a residual with respect to the original Tone Mapped version.

In said second exemplary embodiments, MVC encoding means MVCENC are used to encode the original LDR Tone Mapped version of the HDR video as the main view, that is as AVC video, and inter-view predictive encode the further LDR Tone Mapped version of the HDR video as auxiliary view. As the two versions are relatively similar, MVC should encode the second view very efficiently resulting in small overhead bitstream.

At encoder side ENC, it is further extracted from the second LDR Tone Mapped version and the original HDR video a global illumination GID of the scene. This information doesn't need to very precise as the human eyes do not have the ability to distinct large illumination differences. This information will also be encoded, preferably losslessly, in encoding means LLE. For instance, since inter-view prediction for the two LDR versions does not require motion vectors, global illumination data GID is encoded instead of motion vectors. Another example is global illumination data GID encoded as metadata.

The main view of the resulting data stream is readable and decodable by already deployed AVC decoders to produce the original LDR Tone Mapped video.

Decoders DEC modified according to the invention can reproduce both, the original LDR Tone Mapped video and the HDR video, by combining in a global illumination combiner GIC the original LDR Tone Mapped video with the residual in the second view and processing the combination result according to the global illumination data GID.

Such decoder DEC comprises MVC decoding means MVCDEC which decode an incoming stream to regain a main view and a residual of a second view which can be used together with the main view to reconstruct the second view. The main view or the second view can be output to source LDR displays. The main view or the second view further can be used together with global illumination data GID, decoded using decoding means LLD, in a global illumination combiner GIC to regain the HDR video. Which view is used depends on whether the LDR video used for extracting global illumination data GID is encoded as main view or as second view.

There are many possible implementations for extracting global illumination data GID and/or tone mapping KTM the HDR video to create a second LDR Tone Mapped version. Some exemplary cases are detailed below.

Figure 4:
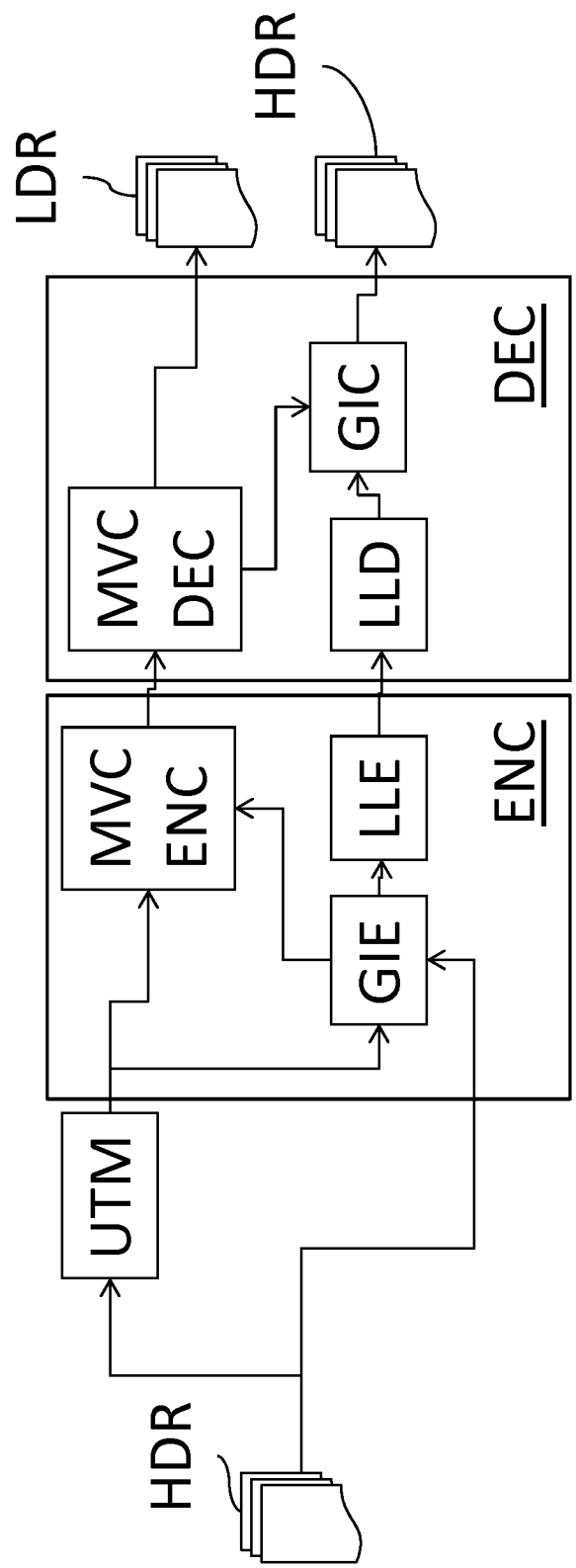
FIG. 4 depicts a first exemplary framework of the invention.

For instance, global illumination GID can be extracted using the original LDR Tone Mapped version and the original HDR video. This is exemplarily depicted in FIG. 4.

Figure 5:
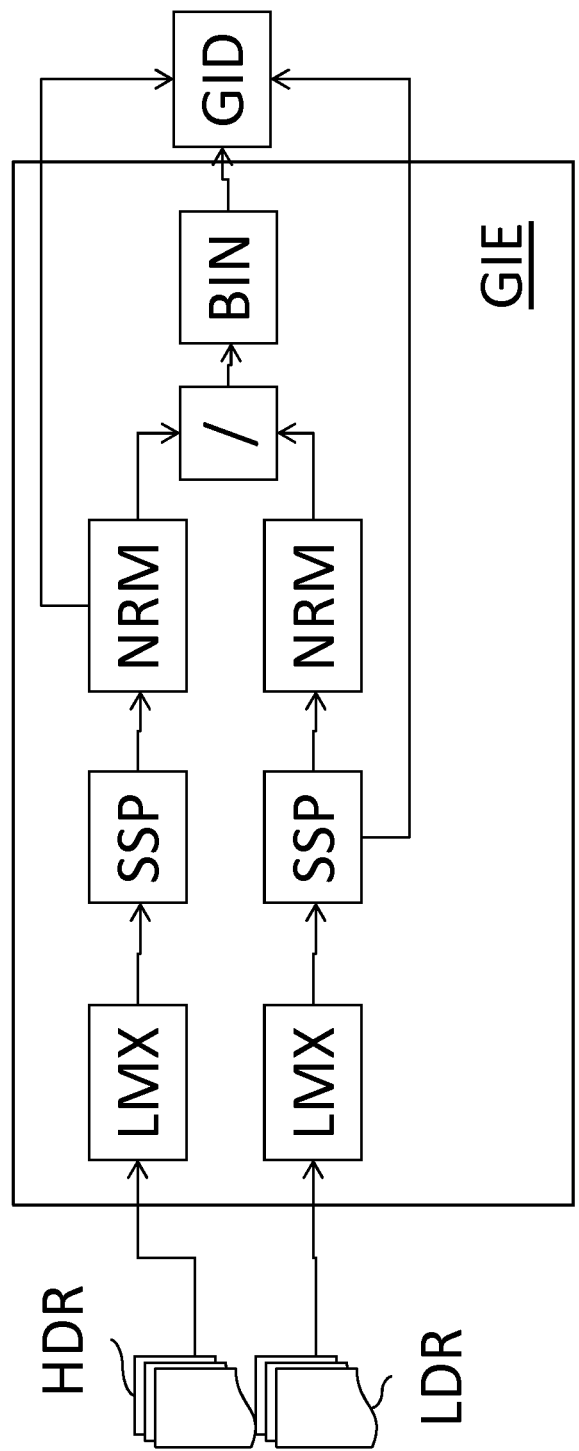
FIG. 5 depicts a first exemplary embodiment of a global illumination data extractor.

In another exemplary case depicted in FIG. 5, ratio of normalized luminance of the HDR video with respect to normalized luminance of the original LDR Tone Mapped version can be used to extract global illumination data GID. In this case the second LDR Tone Mapped version is identical to the original LDR Tone Mapped version, thus there is no residual and the global illumination data can be encoded in the second view.

Optionally, original LDR Tone Mapped version and the HDR video are sub-sampled SSP prior to extraction.

In a second exemplary case depicted in FIG. 3, ratio of normalized luminance of the HDR video with respect to normalized luminance of the second LDR Tone Mapped version can be used to extract global illumination data wherein the second LDR Tone Mapped version results from a known tone mapping KTM of the original HDR video.

Again there is the option to down-sample SSP the second LDR Tone Mapped version and the HDR video prior to extraction.

In both the first and the second exemplary case, the normalization NRM is performed with respect to minimum and maximum values extracted from the HDR video. The luminance ratio is binarized BIN. The Global Illumination data GID is made out of the binarized data and metadata. The metadata inform on the min-max values before luminance ratio binarization BIN and min-max values of the HDR luminance before normalization NRM. If sub-sampling is applied metadata also inform about sub-sampling parameter data.

In the second exemplary case, the second LDR Tone Mapped version can be determined by any tone mapping technique.

In a third exemplary case, a coarse lighting extractor is applied. This is exemplarily depicted in FIG. 7. The principle is the decomposition of the original HDR video into two components: the first component coarsely informs on the lighting of each image and the second component is the result of the coarse lighting removal from the original HDR video, i.e. the second Tone Mapped version of the original HDR video.

First a decomposition computation DEC of the original HDR video is applied. An example for this decomposition is square root, but other decompositions are possible. The resulting video is then sub-sampled SSP, so that each data represents the luminance of a region (group of pixels). This video represents a Global Illumination Video that is part of the Global Illumination Data GID that is sent to the decoder. This Global Illumination Video is then convoluted with a Point Spread Function PSF that models the illumination of each point. E.g. for a LED this represents its spatial illumination. The result is a video which format is the same as the original format since convolution acts as an over-sampling filter. The resulting video is computed using the original HDR video and the Global Illumination Video to form the second LDR Tone Mapped video. For example, HDR luminance-to-Global Illumination ratio is computed.

The Global Illumination Data GID is made up with the Global Illumination Video and some metadata. The metadata is composed such that a decoder is capable to determine, from the metadata alone or in combination with a coding standard, the decomposition model of the original HDR video, the Point Spread Function PSF of each illumination point, and the sub-sampling structure. In embodiments where methods for computing the second LDR video can vary the final computation, e.g. division, is further signalled.

Figure 8:
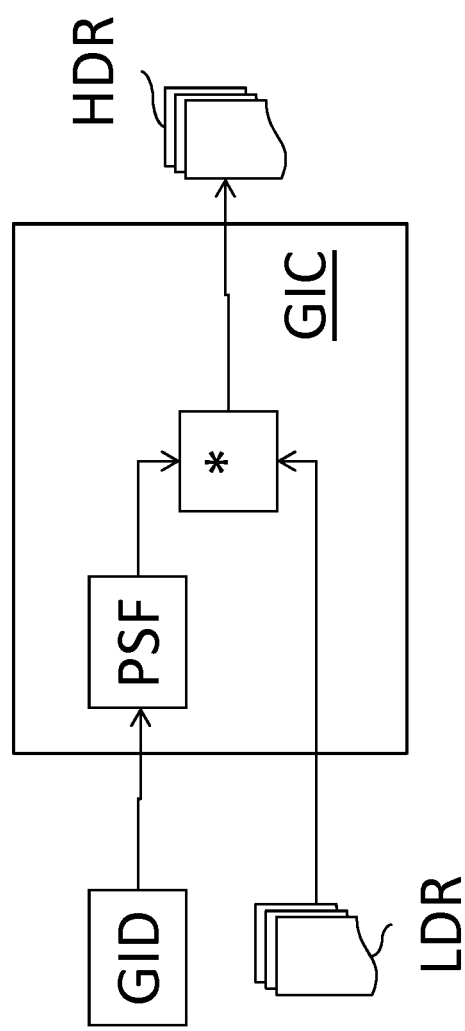
FIG. 8 depicts a second exemplary embodiment of a HDR video reconstructor corresponding to the exemplary embodiment of a global illumination data extractor depicted in FIG. 7.

At decoder side, as exemplarily depicted in FIG. 8, a Global Illumination Combiner GIC is used to convolute the Global Illumination Data with the Point Spread Function PSF. The result is then used together with the decoded second LDR Tone Mapped video to form the reconstructed HDR video by inverting the computation made at encoder side. So if at encoder side division is performed, at decoder side multiplication is performed.

This is in particular useful for sourcing displays with dual modulation technology implemented in the displays, i.e. if sub-sampling and PSF used for encoding correspond to sub-sampling and LED PSF of the display, the second LDR Tone Mapped video could directly source the LCD panel and the Global Illumination data GID could directly source the LED panel.

Among the multiple advantages of the invention there is enablement of efficient encoding of HDR data with a retro-compatibility with standards HDTV systems. Furthermore, this invention bears flexibility and can be easily adapted to specific displays technologies.

Therefore, the invention is applicable in many different fields of industry.

In an exemplary embodiment of the invention global illumination data GID is determined at encoder side using luminance ratios of pixels. This is exemplarily depicted in FIG. 5. A global illumination extracting means GIE receives an HDR video and a LDR tone mapped version of said HDR video as input and extracts luminance videos Y from said HDR video and the tone-mapped version thereof. Optionally, the resulting luminance videos are sub-sampled SUB and normalized NOR to the value range (n_min; n_max) with, e.g. n_min=0 and n_max=1. Alternatively, the resulting luminance videos are not sub-sampled but normalized only. Then an element-wise division DIV of the normalized luminance videos take place which is a pixel-wise division in case of no sub-sampling. The resulting luminance ratios are then binarized BIN using b_min and b_max. The binarized luminance ratios together with n_min, n_max, b_min and b_max then represents the global illumination data GID.

Figure 6:
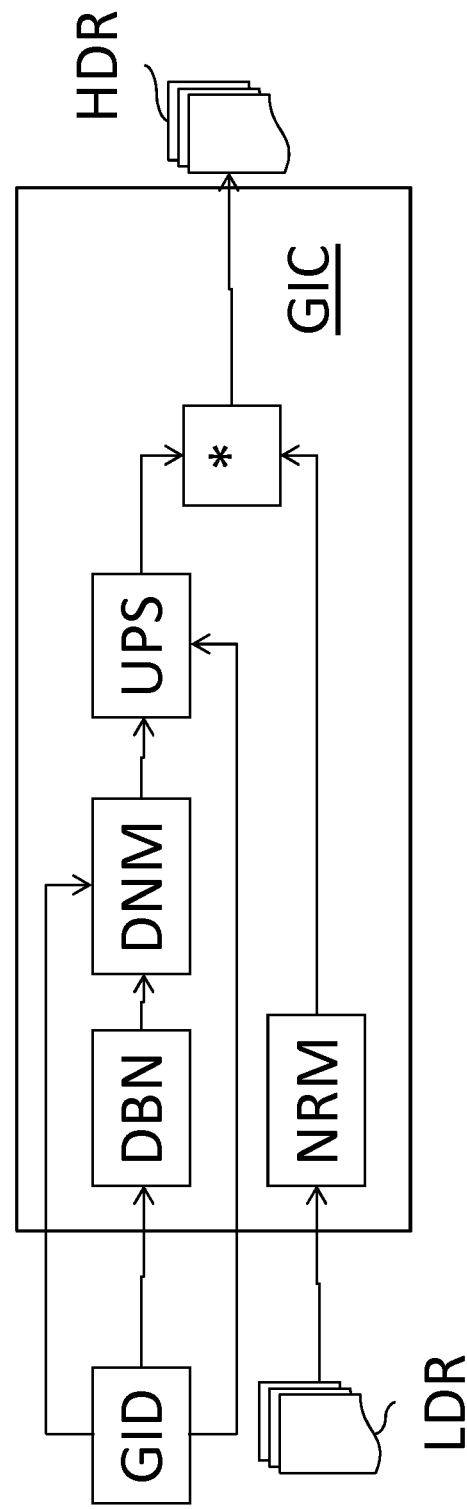
FIG. 6 depicts a first exemplary embodiment of a HDR video reconstructor corresponding to the exemplary embodiments of a global illumination data extractor depicted in FIG. 5.

At decoder side, as exemplarily depicted in FIG. 6, the global illumination data GID can be used together with the LDR tone mapped version of the HDR video for reconstructing said HDR video.

That is at decoder side the b_min, b_max, n_min and n_max are used to debinarize DBN and de-normalize DNM the global illumination data GID. If resolution of the global illumination data GID is smaller than resolution of the LDR tone mapped version of the HDR video to-be-reconstructed, the de-normalized data is up-sampled to the resolution of said the LDR tone mapped version. The LDR tone mapped version of the HDR video to-be-reconstructed is normalized using n_min and n_max. Then, the normalized LDR video is pixel-wise multiplied by the de-normalized data of same resolution which results in reconstruction of the HDR video.

The LDR tone mapped version of the HDR video used in this exemplary embodiment can be an LDR tone mapped version where the tone mapping is unknown. In this case, it can be advantageous to not execute the sub-sampling as this may cause artifacts in the reconstructed HDR image.

In case tone mapping of the LDR tone mapped version of the HDR video is known and conveyed to the decoding side possibly occurring artifacts in the reconstructed HDR can be removed.

In a further exemplary embodiment of the invention global illumination data GID is determined at encoder side using luminance ratios of pixels, too. But in this further exemplary embodiment, a point spread function is used to generate the global illumination data from the HDR video. That is decomposition is applied.

Figure 7:
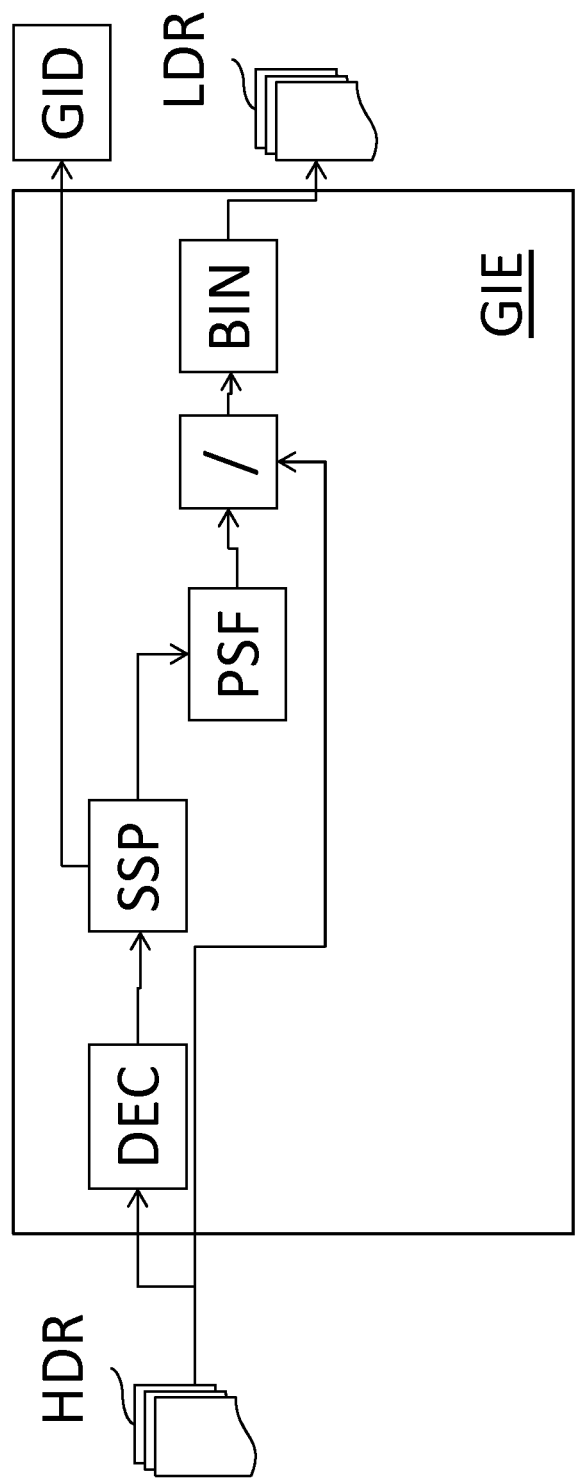
FIG. 7 depicts a second exemplary embodiment of a global illumination data extractor.

This is exemplarily depicted in FIG. 7. A global illumination extracting means GIE receives an HDR video and generates global illumination Data GID there from using decomposition DEC of the HDR video, sub-sampling SSP of the decomposed HDR video and convolution of the sub-sampled decomposed HDR video using a point spread function PSF. Then the global illumination Data GID is convoluted using a point spread function PSF and the HDR video is divided pixel-wise by the convolution result in order to generate an LDR tone mapped version of said HDR video. Global illumination Data GID and the LDR tone mapped version are then encoded and transmitted to a decoder or stored.

Corresponding reconstruction of the HDR video is exemplarily depicted in FIG. 8. Global illumination Data GID and the LDR tone mapped version of the HDR video to-be-reconstructed are received. Then the global illumination Data GID is convoluted using the same point spread function PSF as at encoder side and the LDR tone mapped version is multiplied pixel-wise by the convolution result in order to reconstruct said HDR video.

In an exemplary embodiment of the invention there is a non-transitory storage medium carrying an HDR video of high dynamic range predictive encoded using and LDR video as reference, the LDR video providing a lower dynamic range depiction of the HDR video content. The LDR video is further encoded. The non-transitory storage medium is carrying an encoded residual of a further LDR video with respect to the LDR video as reference and lossless encoded global illumination data wherein the further LDR video provides a further lower dynamic range depiction of the HDR video content and the global illumination data allows for reconstructing the HDR video using the further LDR video.

Among the exemplary embodiments there is also a method for predicting a high dynamic range image element. Said method comprises receiving low dynamic range image data and receiving high dynamic range image data comprising global illumination data and an LDR residual image element. The method further comprises extracting an LDR image value from said LDR image data; and combining said LDR image value with said LDR residual image element to form an LDR image element. Finally, said LDR image element is modified based on said global illumination data to form an HDR image element.

Among the exemplary embodiments there is also a further method for predicting a high dynamic range image element. Said method comprises receiving low dynamic range image data; receiving high dynamic range image data comprising prediction data and an HDR residual image element; extracting an LDR image value from said LDR image data; modifying said LDR image value based on said prediction data; and combining said modified LDR image value with said HDR residual image element to form an HDR image element.

And there is an exemplary embodiment which realizes an encoding of an HDR video of high dynamic range together with an LDR video—wherein the LDR video provides a lower dynamic range depiction of the HDR video content— by using processing means for extracting a further LDR video and corresponding global illumination data from the HDR video, encoding a first LDR video independently and predictive encoding a second LDR video using the first LDR video as reference, and encoding the global illumination data wherein, either, the first LDR video is the LDR video and the second LDR video is the further LDR, or, the first LDR video is the further LDR video and the second LDR video is the LDR video.

The invention claimed is:

1. A method of encoding an HDR video of high dynamic range together with an LDR video, the LDR video providing a lower dynamic range depiction of the HDR video content, the method comprising:
   encoding a first tone mapped version of the HDR video, called a first LDR video, and a second tone mapped version of the HDR video, called a second LDR video, extracted from the HDR video independently of the first LDR video;
   predictive encoding the second LDR video using the first LDR video as reference; and
   lossless encoding global illumination data further extracted from the HDR video.

2. The method of claim 1, wherein the LDR video is the first LDR video.

3. The method of claim 1, wherein the LDR video is the second LDR video.

4. The method of claim 1, wherein extracting the global illumination data comprises: extracting luminance videos from the HDR video and the LDR video, normalizing the luminance videos, pixels-wise computing raw illumination data using the luminance videos and computing the global illumination data by binarizing of the raw illumination data, the method further comprising encoding one or more parameters allowing for de-normalization and/or de-binarization.

5. The method of claim 4, wherein the luminance videos are sub-sampled prior to normalization, and wherein one or more up-sampling parameters are encoded, the up-sampling parameters allowing for inverting sub-sampling.

6. The method of claim 1, wherein the global illumination data is extracted by applying a decomposition computation on the HDR video and sub-sampling the decomposed video and wherein the further LDR video is extracted by convoluting the sub-sampled video with a point spread function and pixels-wise computing the further LDR video using the convoluted video and the HDR video.

7. A data stream embodied in a non-transitory computer-readable medium carrying an HDR video encoded together with an LDR video, the LDR video providing a lower dynamic range depiction of the HDR video content, the HDR video being encoded together with the LDR video according to the method of claim 1.

8. A non-transitory storage medium carrying an HDR video encoded together with an LDR video, the LDR video providing a lower dynamic range depiction of the HDR video content, the HDR video being encoded together with the LDR video according to the method of claim 1.

9. A device for encoding an HDR video of high dynamic range together with an LDR video, the LDR video providing a lower dynamic range depiction of the HDR video content, the device comprising a processor configured to:
   encode a first tone mapped version of the HDR video, called a first LDR video, and a second tone mapped version of the HDR video, called a second LDR video, extracted from the HDR video independently from the first LDR video and
   predictive encode the second LDR video using the first LDR video as reference, and lossless encode global illumination data further extracted from the HDR video.

10. The device of claim 9, wherein the LDR video is the first LDR video.

11. The device of claim 9, wherein the LDR video is the second LDR video.

12. The device of claim 9, wherein extracting the global illumination data comprises: extracting luminance videos from the HDR video and the LDR video, normalizing the luminance videos, pixels-wise computing raw illumination data using the luminance videos and computing the global illumination data by binarizing of the raw illumination data, the method further comprising encoding one or more parameters allowing for de-normalization and/or de-binarization.

13. The device of claim 12, wherein the luminance videos are sub-sampled prior to normalization, and wherein one or more up-sampling parameters are encoded, the up-sampling parameters allowing for inverting sub-sampling.

14. The device of claim 9, wherein the global illumination data is extracted by applying a decomposition computation on the HDR video and sub-sampling the decomposed video and wherein the further LDR video is extracted by convoluting the sub-sampled video with a point spread function and pixels-wise computing the further LDR video using the convoluted video and the HDR video.

15. A method of reconstructing an HDR video of high dynamic range, the method comprising:
    decoding an LDR video, the LDR video providing a lower dynamic range depiction of the HDR video content,
    using the LDR video and a residual for decoding a second LDR video, the second LDR video providing a further lower dynamic range depiction of the HDR video content,
    decoding global illumination data and using the global illumination data and one of the first or second LDR video for reconstructing the HDR video.

16. The method of claim 15, wherein the first LDR video is the LDR video.

17. The method of claim 15, wherein the second LDR video is the LDR video.

18. The method of claim 15, wherein one or more parameters are decoded and used for at least one of: de-normalizing, de-binarization and up-sampling the global illumination data.

19. The method of claim 15, wherein the global illumination data is convoluted with a point spread function after decoding.

20. The device for reconstructing an HDR video of high dynamic range, the device comprising a processor configured to:
    decode an LDR video, the LDR video providing a lower dynamic range depiction of the HDR video content,
    use the LDR video and a residual to decode a second LDR video, the second LDR video providing a further lower dynamic range depiction of the HDR video content,
    decode global illumination data and to use the global illumination data and one of the first or second LDR video for reconstructing the HDR video.

21. The device of claim 20, wherein the first LDR video is the LDR video.

22. The device of claim 20, wherein the second LDR video is the LDR video.

23. The device of claim 20, wherein one or more parameters are decoded and used for at least one of: de-normalizing, de-binarization and up-sampling the global illumination data.

24. The device of claim 20, wherein the global illumination data is convoluted with a point spread function after decoding.

* * * * *

UNITED STATES PATENT AND TRADEMARK OFFICE
CERTIFICATE OF CORRECTION

PATENT NO. : 10,110,921 B2
APPLICATION NO. : 14/370773
DATED : October 23, 2018
INVENTOR(S) : Yannick Olivier et al.

Page 1 of 1

It is certified that error appears in the above-identified patent and that said Letters Patent is hereby corrected as shown below:

On the Title Page

Item (54) TITLE: replace "PF STORAGE MEDIUM" with --NON-TRANSITORY STORAGE MEDIUM--

In the Specification

Column 1, Line 6: replace "PF STORAGE MEDIUM" with --NON-TRANSITORY STORAGE MEDIUM--

In the Claims

Claim 9, Column 8, Line 65: replace "video and" with --video;--

Signed and Sealed this
Eleventh Day of October, 2022

Katherine Kelly Vidal
*Director of the United States Patent and Trademark Office*